(12) United States Patent
Depp et al.

(10) Patent No.: US 8,913,371 B2
(45) Date of Patent: Dec. 16, 2014

(54) AUTOMOTIVE FUSE AND RELAY BLOCK ASSEMBLY

(71) Applicant: Sumitomo Electric Wiring Systems, Inc., Bowling Green, KY (US)

(72) Inventors: Charles Depp, Ann Arbor, MI (US); Akihiro Max Matsumura, Northville, MI (US); Brian Carnick, New Baltimore, MI (US); Nathan Zukowski, Ann Arbor, MI (US)

(73) Assignee: Sumitomo Wiring Systems, Ltd. (JP)

( * ) Notice: Subject to any disclaimer, the term of this patent is extended or adjusted under 35 U.S.C. 154(b) by 169 days.

(21) Appl. No.: 13/661,162

(22) Filed: Oct. 26, 2012

(65) Prior Publication Data

US 2014/0118888 A1    May 1, 2014

(51) Int. Cl.
*H02B 1/26*    (2006.01)

(52) U.S. Cl.
USPC ........... 361/626; 361/627; 361/630; 361/642; 361/823; 361/833

(58) Field of Classification Search
USPC ........ 361/611, 614, 621–622, 624, 626–631, 361/637–650, 679.4, 715, 728, 760, 775, 361/781, 819, 823, 833
See application file for complete search history.

(56) References Cited

U.S. PATENT DOCUMENTS

| | | | | |
|---|---|---|---|---|
| 6,822,163 B2 * | 11/2004 | Saneto et al. | | 174/50 |
| 6,835,073 B2 * | 12/2004 | Kobayashi | | 439/76.2 |
| 2005/0221640 A1 * | 10/2005 | Saka | | 439/76.2 |
| 2008/0247133 A1 * | 10/2008 | Ito | | 361/687 |
| 2013/0280952 A1 * | 10/2013 | Saimoto et al. | | 439/527 |

FOREIGN PATENT DOCUMENTS

JP    2003-79027    3/2003

* cited by examiner

*Primary Examiner* — Courtney Smith
(74) *Attorney, Agent, or Firm* — Gerald E. Hespos; Michael J. Porco; Matthew T. Hespos (57) ABSTRACT

A fuse and relay block assembly (10) for an automotive vehicle includes a lower cover (12) and an upper cover (60) mounted in substantially opposed relationship to one another. A relay block (70) is mounted between the lower cover (12) and the upper cover (60) and can receive electrical devices (R, F) mounted along a mounting direction (MD). A relay module assembly (80) is mounted between the lower cover (12) and the upper cover (60) and can receive electrical devices (R, F) mounted along a transverse direction (TD) substantially perpendicular to the mounting direction (MD). Thus, a greater density of electrical devices (R, F) can be mounted within a smaller footprint.

10 Claims, 7 Drawing Sheets

FIG.8

AUTOMOTIVE FUSE AND RELAY BLOCK ASSEMBLY

BACKGROUND OF THE INVENTION

1. Field of the Invention

The invention relates to a fuse and relay block assembly for an automotive vehicle.

2. Description of the Related Art

A fuse and relay block for an automotive vehicle includes a housing, a relay/fuse module mounted in the housing and a cover removably mounted to the housing for covering and protecting the relay/fuse module. Relay connectors and fuse connectors are mounted on the relay/fuse module and are connected by wires to electrically powered components of the vehicle, such as the windshield wipers, the fuel pump, the water pump, cooling fans, an air conditioner compressor, power windows, power doors, door locks, power seats, the sound system, the navigation system and various lighting groups, the horn. Relays and fuses are mounted removably in the relay and fuse connectors of the relay/fuse module.

Fuses protect certain of the electrically powered components of the vehicle from damage due to a current overload that could occur. Fuses typically are parts of circuits associated with components of the vehicle that draw low current levels, such as indicator lights, dashboard lights, the sound system, and the navigation system.

Relays are electrically powered switches. More particularly, a relay will use a small amount of current in one circuit to control a much larger current in another circuit. Relays typically are associated with circuits that draw larger current levels than the circuits with which the fuses are associated. For example, relays may be used with the circuits that control cooling fans, power windows, power seats, the rear window defogger and the heater. One or more fuses may be associated with certain of the relays, for example, to control the low current circuit that controls the switch of the relay.

Fuses and relays may require replacement, and hence must be accessible. The typical fuse and relay block has a closely spaced array of relays and fuses disposed substantially in a common plane and positioned in a housing. The relays and fuses face outward from the common plane and are accessible by removing the cover from the housing.

Automotive vehicles continue to have more electrically powered components and hence a larger number of circuits. The additional components that require low current levels will be parts of circuits protected by fuses. The additional components that require high current levels will be parts of circuits that are controlled by relays, and at least certain of those relays are protected by fuses. Thus, an increasing number of fuses and relays must be incorporated into a fuse and relay block and must be accessible for replacement as needed. A larger fuse and relay block could accommodate a larger planar array of fuses and relays. However, the space available in a vehicle is at a premium and the fuse and relay block must compete with other necessary parts of the vehicle for the limited space. Often the footprint available in the vehicle for the fuse and relay block is fixed even though the number of circuits increases.

JP 2003-079027 discloses a junction box with optional modular arrays of fuses and relays to accommodate the particular needs in a vehicle. The specific modular arrays will be selected and accommodated into a housing to meet the needs of the electrically powered components in the particular vehicle. The teaching of JP 2003-079027 leads to manufacturing and design efficiencies, but does not address the problems caused by an increased number of electrically powered components in the vehicle and the corresponding need to accommodate a larger number of easily accessible fuses and relays in a limited available space.

Accordingly, an object of the invention is to provide a fuse and relay box that can accommodate a larger number fuses and relays within a limited available space.

A further object of the invention is to provide a fuse and relay box that assures efficient and convenient access at least to those fuses and relays that are likely to require service and/or replacement

SUMMARY OF THE INVENTION

The invention relates to a fuse and relay block assembly with a lower cover that is configured to be mounted securely in a vehicle. The lower cover is configured to accommodate wires and connectors that extend from various circuits in the vehicle and that are to be connected to fuses and relays in the fuse and relay block assembly. Accordingly, the lower cover may include a wiring harness guide that extends from external locations into interior regions of the lower cover. The lower cover may further include locks for securely locking the lower cover to the vehicle and for securely locking other parts of the fuse and relay block assembly to the lower cover.

The fuse and relay block assembly may further include a relay block collar that can be mounted securely in the lower cover. The relay block collar is effectively a frame that is divided to form a relay block cavity and a relay module cavity. The relay block cavity and the relay module cavity preferably open along a mounting direction of the relay block collar onto the lower cover, and hence provide communication between the regions bounded by the lower cover for accommodating wires and connectors and regions above the relay block collar. The relay block collar may further include locking structures for locking the relay block collar to the lower cover and additional locking structures for engaging other parts of the fuse and relay block assembly, as explained further herein. The relay block cavity preferably is larger than the relay module cavity.

The fuse and relay block assembly further includes an upper cover that can be mounted releasably to the relay block collar and/or the lower cover. The upper cover is configured to enclose and protect components mounted in the relay block collar and/or disposed within the lower cover. The upper cover may be movable relative to the relay block collar and the lower cover substantially along the mounting direction of the relay block collar onto the lower cover.

The fuse and relay block assembly further includes a relay block that is configured to be mounted in the relay block cavity of the relay block collar. The relay block has a plurality of electrical device connectors that are connected by wires, busbars or conductive traces on a circuit board to circuits of the vehicle. The electrical device connectors of the relay block are configured to be connected with electrical devices along a mounting direction that preferably is parallel to the mounting direction of the relay block collar onto the lower cover or the mounting direction of the upper cover onto the relay block collar. The electrical device connectors may be relay connectors configured for connecting with relays or fuse connectors configured for connection with fuses. The relay connectors may be connected by wires to high current circuits of the vehicle. The fuse connectors may be connected by wires to low current circuits of the vehicle, such as the low current circuits that control the relays. The fuses that may be mounted in the relay block typically are smaller than the relays in the relay block and are disposed in spaces on the relay block that are not occupied by the relays. The relays and fuses accommodated in the relay block preferably are those that are most likely to require access for service or replacement.

The fuse and relay block assembly further includes a relay block module assembly that is configured to be mounted in the relay block module cavity of the relay block collar. The relay block module assembly preferably comprises a circuit board and/or other circuit device to which a plurality of fuse connectors and/or relay connectors are connected. The circuit board or other circuit device of the relay block module assembly preferably is configured for mounting into the relay block module cavity in a direction parallel to the mounting direction of the relays into the relay block. Wiring harness connectors preferably are provided at a lower end of the relay block module assembly and are connectable with connectors of one or more wiring harnesses that extend into the fuse and relay block assembly from circuits of the vehicle. Fuses and/or relays are connectable to the fuse and relay connectors of the relay block module assembly along a transverse direction that preferably is perpendicular to the mounting direction of the relays onto the relay block and hence perpendicular to the mounting direction of the relay block module assembly into the relay block module cavity of the relay block collar.

At least certain of the fuses and/or relays of the relay block module assembly may lie above the relay block collar and the relay block in an easily accessible location when the relay block module assembly is mounted into the relay block module cavity of the relay block collar. Fuses and/or relays that are less likely to require service or replacement may be disposed at lower less accessible locations.

The fuse and relay block module assembly preferably further comprises front and rear covers that are mounted around the circuit board and the fuse connectors and/or relay connectors of the relay block module assembly. The front and rear covers of the relay block module assembly are configured to be locked releasably together and may enclose certain of the fuses and/or relays therein. However, parts of the front or rear covers may include openings so that certain fuses and/or relays can be mounted in the respective connectors without separating the front and rear covers. The openings in the front or rear covers preferably are at upper parts of the relay block module assembly and above the relay block and the relay block collar for easy access.

The fuse and relay block assembly is mounted in the vehicle with the relays and fuses protectively enclosed between the upper and lower covers. All of the relays and fuses mounted on the relay block can be accessed for replacement merely by removing the upper cover. Relays and fuses in the relay block can be removed parallel to the mounting direction. Fuses and/or relays at least in the upper part relay block module assembly can be removed in the transverse direction that is perpendicular to the mounting direction of the fuses and relays of the relay block. The above-described relay block module enables a significant increase in the number of fuses and relays that can be accommodated in the fuse and relay block assembly without increasing the footprint and without reducing accessibility.

DETAILED DESCRIPTION OF THE PREFERRED EMBODIMENTS

Figure 1:
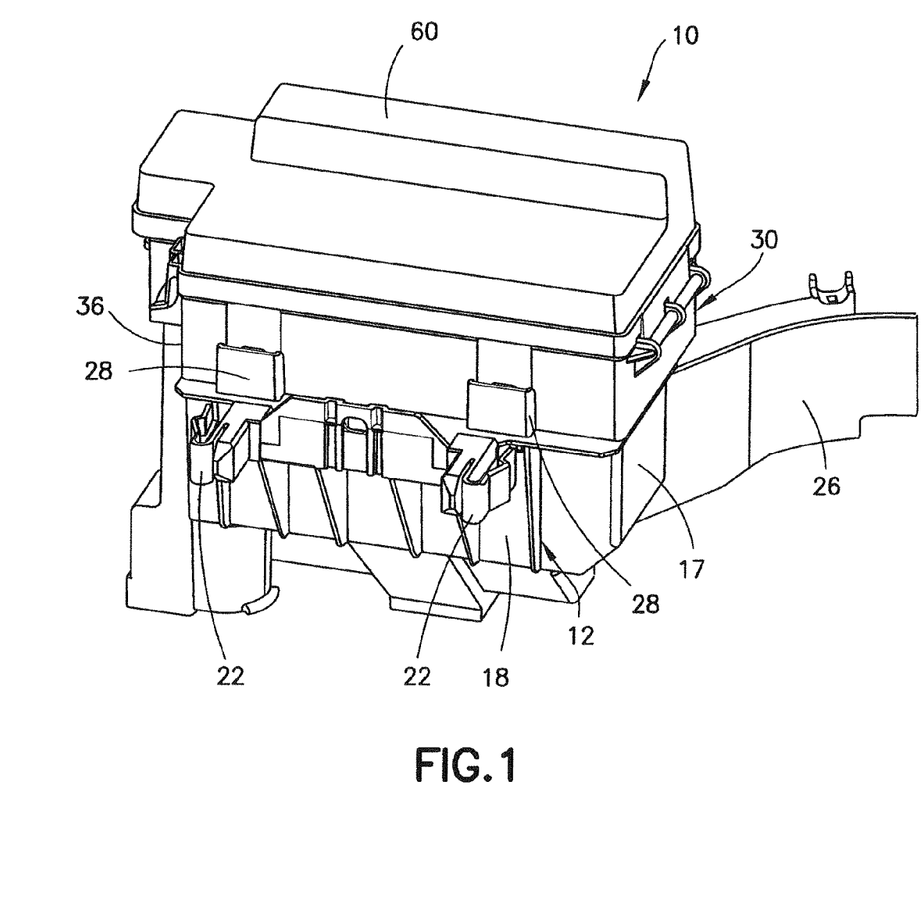
FIG. 1 is a perspective view of a fuse and relay block assembly in accordance with an embodiment of the invention.
Figure 2:
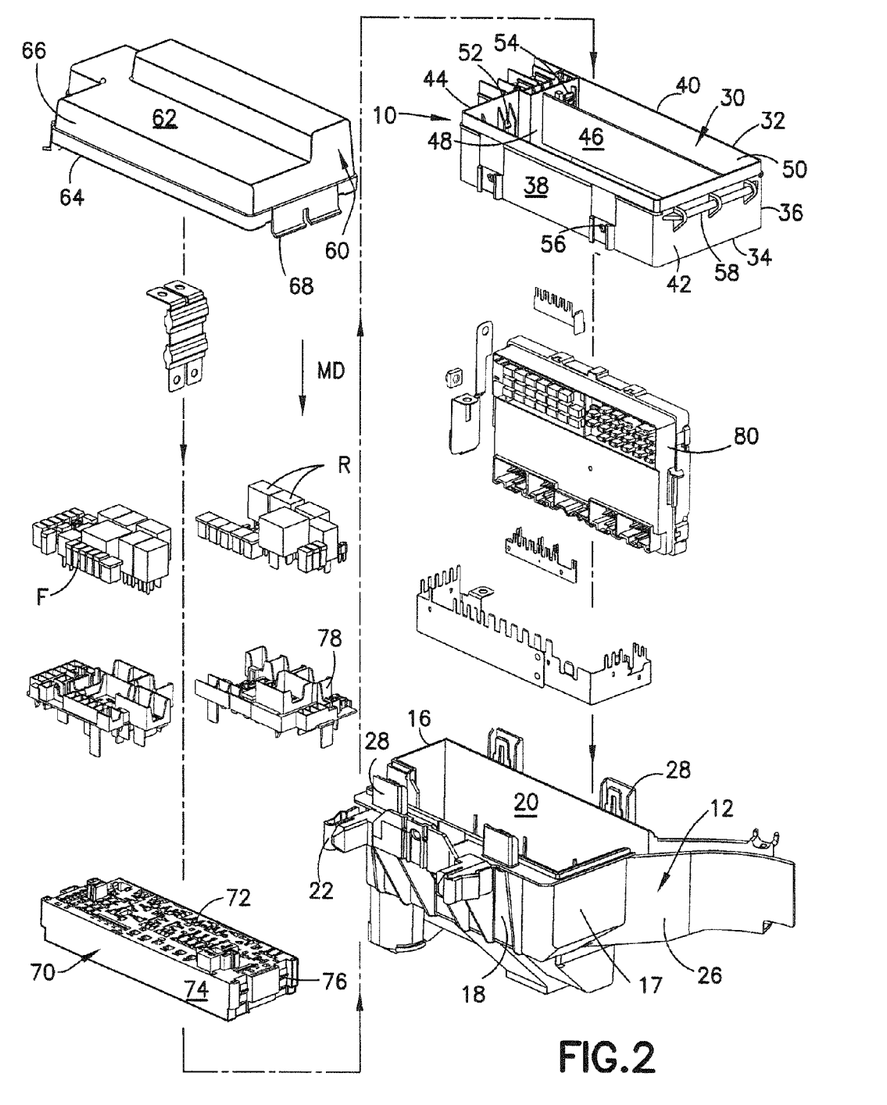
FIG. 2 is an exploded perspective view of the fuse and relay block assembly of FIG. 1.

A fuse and relay block assembly in accordance with the subject invention is identified generally by the numeral 10 in FIGS. 1 and 2. The fuse and relay block assembly 10 includes a lower cover 12 with a closed bottom 14, an open top 16 and a sidewall enclosure 17 extending between the bottom 14 and the top 16. The sidewall enclosure 17 includes opposite front and rear walls 18 and 20. Mounting projections 22 extend out from the front wall 18. Each mounting projection 22 is dimensioned and configured to be inserted into a mounting aperture in a panel of an automotive vehicle and includes a resiliently deflectable locking finger 24 that can lock with a surface of the panel adjacent the mounting aperture to hold the lower cover 12 in position on the panel. A wiring harness guide 26 projects diagonally out from a corner of the sidewall enclosure 17 adjacent the rear wall 20 and communicates with the area enclosed by the sidewall enclosure 18. The wire harness guide 26 is dimensioned and configured to guide at least one wire harness of the automotive vehicle into the area bounded by the sidewall enclosure 17 of the lower cover 12. Locking structures 28 project up from open top 16 of the lower cover 12 at the front and rear walls 18 and 20.

The fuse and relay block assembly 10 further includes a relay block collar 30. The relay block collar 30 is a generally frame-shaped structure with an open top 32, an open bottom 34 and a sidewall enclosure 36. Portions of the sidewall closure 36 adjacent the open bottom 34 are dimensioned to nest with or seat on portions of the side wall enclosure 17 of the lower cover 12 adjacent the open top 16 of the lower cover 12.

The sidewall enclosure 36 of the relay collar 30 includes opposite front and rear walls 38 and 40 and opposite first and second end walls 42 and 44. An intermediate wall 46 extends between the end walls 42 and 44 and is substantially parallel to the front and rear walls 38 and 40. The intermediate wall 46 divides the relay block collar 30 into a relay block cavity 48 between the front wall 38 and the intermediate wall 46 and a relay module cavity 50 between the rear wall 40 and the intermediate wall 46. The distance between the front wall 38 and the intermediate wall 46 is significantly more than the distance between the rear wall 40 and the intermediate wall 46 so that the relay module cavity 50 is significantly smaller in a front to rear direction and the relay block cavity 48.

Relay block locking projections 52 are formed on portions of the first and second end walls 42 and 44 facing into the relay block cavity 48. Similarly, relay module locking projections 54 are formed on portions of the first and second end walls 42 and 44 facing into the relay module cavity 50.

Lower cover locks 56 are formed on outer surfaces the front and rear walls 38 and 40 of the relay block collar 30 at positions near the open bottom 34. The lower cover locks 56 are disposed and configured to lock into engagement with the locking structures 28 that project up from open top 16 of the lower cover 12 when the open bottom 34 of the relay block collar 30 is mounted on the open top 16 of the lower cover 12.

Upper cover locks 58 are mounted on outer surfaces of the first and second end walls 42 and 44 of the relay block collar 30 at positions near the open top 32 of the relay block collar 30.

The fuse and relay block assembly 10 further includes an upper cover 60 with a closed top wall 62, an open bottom 64 and a sidewall enclosure 66. The open bottom 64 of the upper cover 60 is configured to nest with or seat on the relay block collar 30. The top wall 62 of the upper cover 60 is of stepped configuration so that parts of the top wall 62 that register with the relay module cavity 50 of the relay collar 30 are at a higher position relative to other parts of the top wall 62. Relay collar locks 68 project down from open bottom 64 of the sidewall enclosure 66 of the upper cover 60. The relay collar locks 68 are disposed and configured to releasably engage the upper cover locks 58 of the relay block collar 30 when the upper cover 60 is mounted in a mounting direction MD on the relay block collar 30. The mounting direction MD extends substantially parallel to the front and rear walls 38 and 40, the end walls 42 and 44 and the intermediate wall 46 of the relay block collar 30. In the mounted condition, the open bottom 64 of the upper cover 60 nests with or sits on the open top 32 of the relay block collar 30, as shown in FIG. 2. Additionally, the lower cover 12, the relay block collar 30 and the upper cover 60 define an accessible enclosure between the bottom wall 14 of the lower cover 12 and the top wall 62 of the upper cover 60.

Figure 3:
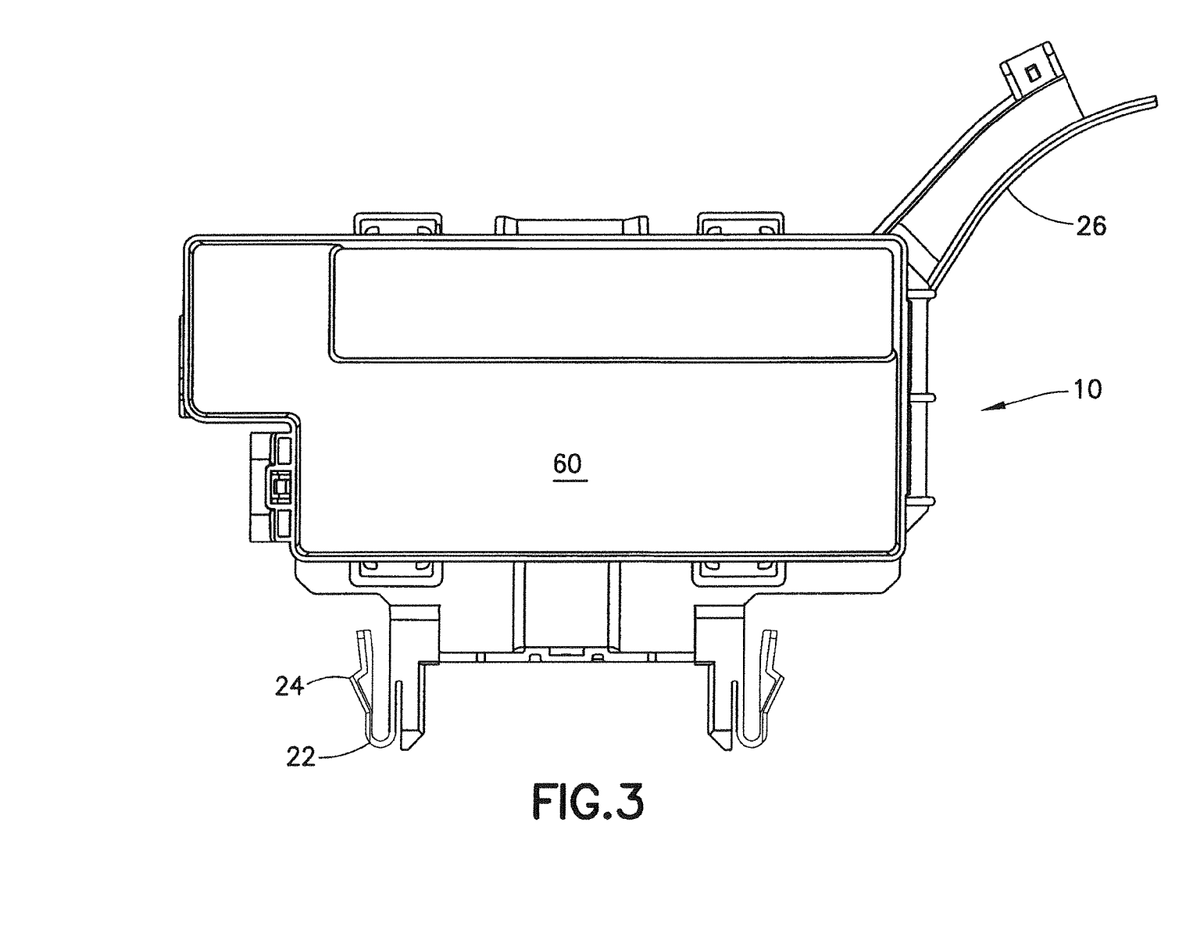
FIG. 3 is a top plan view of the fuse and relay block assembly.
Figure 4:
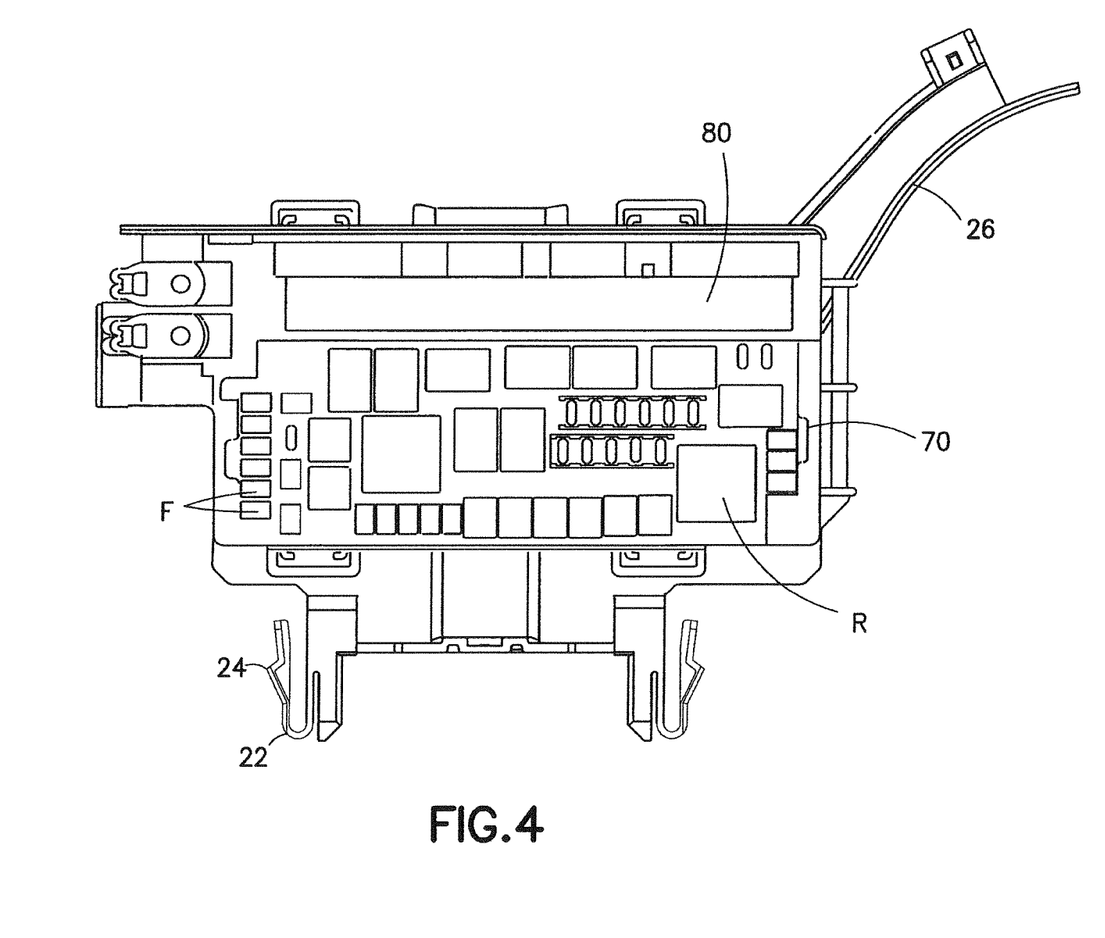
FIG. 4 is a top plan view of the fuse and relay block assembly with an upper cover thereof removed.
Figure 5:
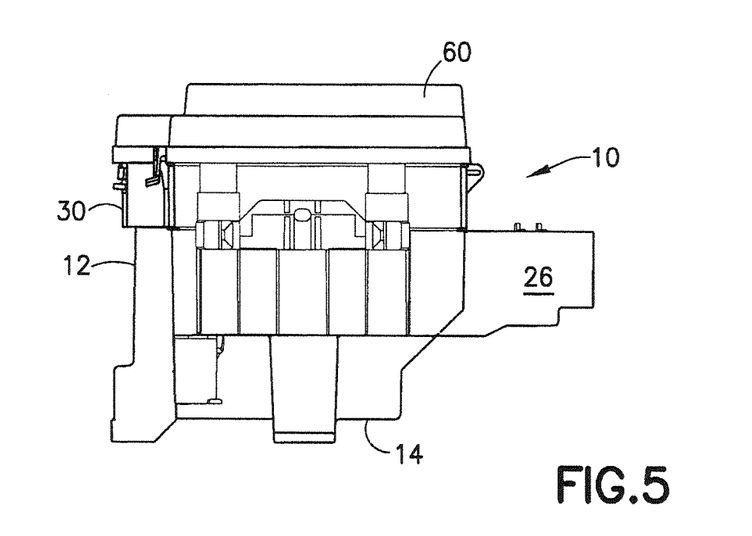
FIG. 5 is a front elevational view of the fuse and relay block assembly.

The fuse and relay block assembly 10 further includes a relay block 70 with a top wall 72, a bottom (not shown) and a sidewall enclosure 74. The sidewall enclosure 74 is configured to enable the relay block 70 to telescope along the mounting direction MD into the relay block cavity 48 of the relay collar 30. Locks 76 are formed on opposite ends of the sidewall enclosure 74 and are disposed to engage the relay block locking projections 52 in the relay block cavity 48 of the relay block collar 30 for securely holding the relay block 70 in the relay block cavity 48. The relay block 70 includes one or more internal circuit boards, busbars and/or wires connected to an array of electrical device connectors, such as fuse and relay connectors 78 that are accessible at the top wall 72 of the relay block 70. The internal circuit boards, busbars and/or wires of the relay block 70 connect to the one or more wiring harnesses that are guided through the wire harness guide 26 and into the lower cover 12. Relays R and fuses F, as examples of the electrical devices, are mounted in the respective connectors 78 of the relay block 70, as shown most clearly in FIG. 3. The fuses F of the relay block 70 are mostly associated with and connected to the circuits of the relays R in the relay block 70.

Figure 6:
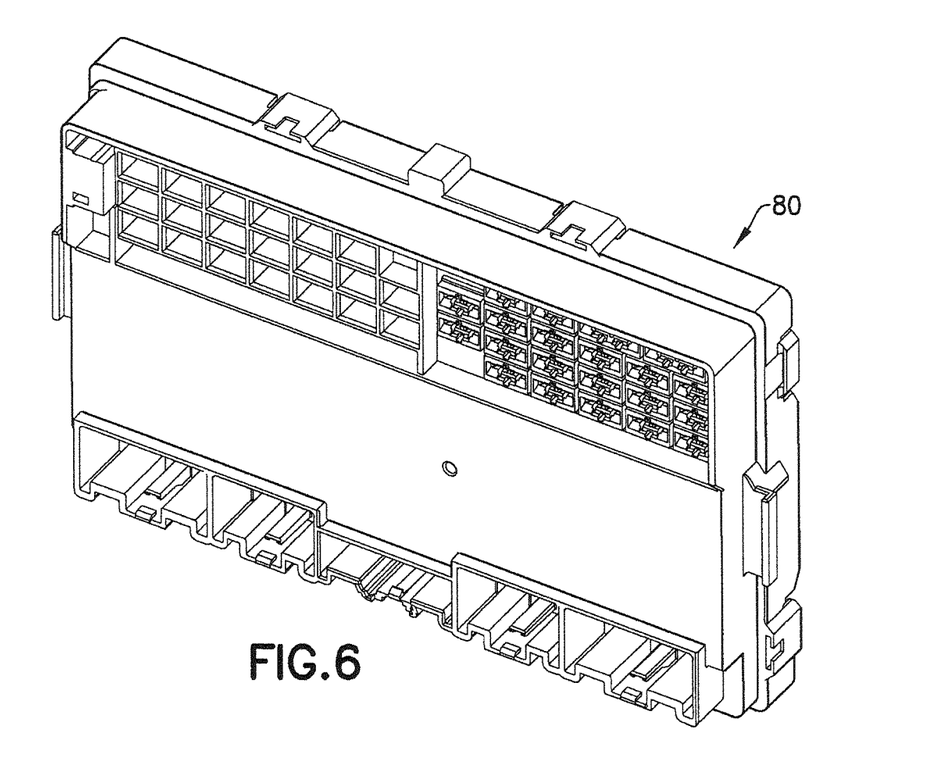
FIG. 6 is a perspective view of the relay block module assembly.
Figure 7:
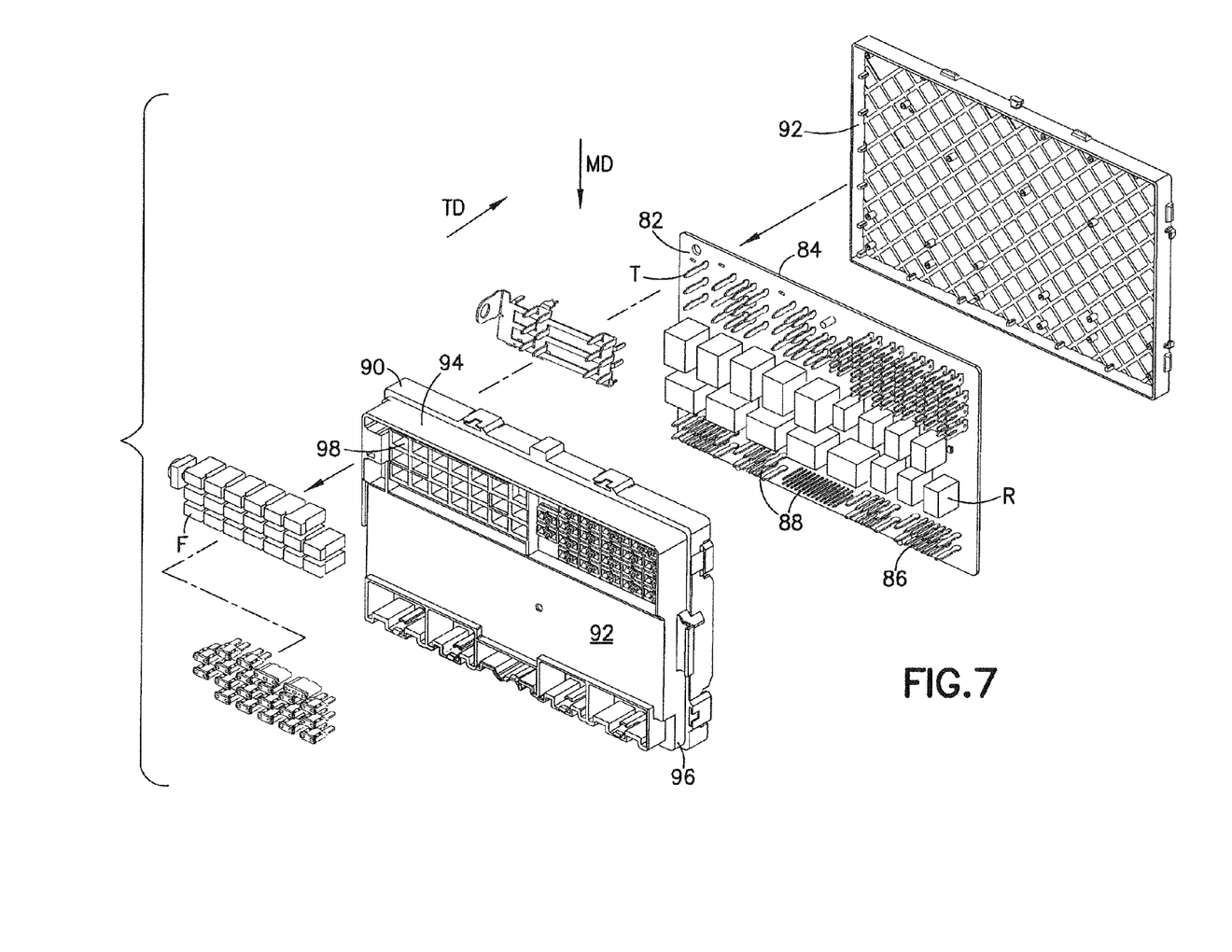
FIG. 7 is an exploded perspective view of the relay block module assembly of FIG. 6.
Figure 8:
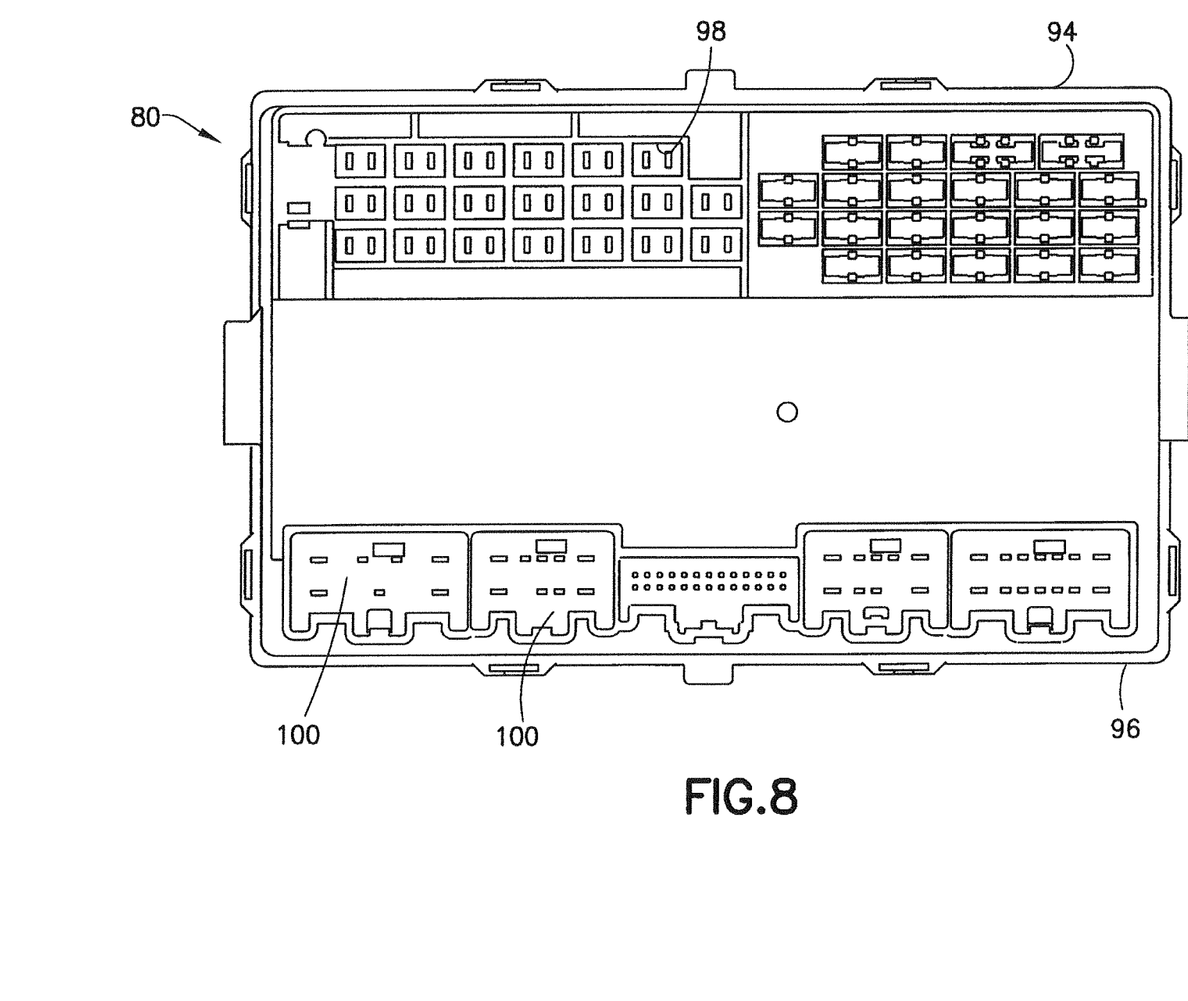
FIG. 8 is a front elevational view of the relay block module assembly.

As noted above, automobiles continue to have more electrically powered components and hence require more circuits, more fuses and more relays. Competing demands for the limited space in an automobile does not permit an increase in the footprint available for fuses and relays despite the increased number of circuits that require fuses and relays. Accordingly, the fuse and relay block assembly 10 further includes a relay module assembly 80 that can be telescoped along the mounting direction MD into the relay module cavity 50 of the relay block collar 30. More particularly, as shown in FIGS. 6-8, the relay module assembly 80 includes a circuit board 82 that will be oriented in a plane that includes the mounting direction MD and that is substantially parallel to the front and rear walls 38 and 40 and the intermediate wall 46 of the relay block collar 30. The circuit board 82 includes opposite top and bottom ends 84 and 86 spaced apart along the mounting direction MD. Terminals T are connected mechanically and electrically to circuit regions provided on or connected to the circuit board 80. These circuit regions extended to connection terminals 88 in proximity to the bottom end 86 of the circuit board 82. Terminals disposed in an intermediate region between the top and bottom ends 84 and 86 of the circuit board 82 have electrical devices, such as relays R mounted thereto. The relays R on the circuit board 82 are associated with circuits that are not likely to require service. Terminals between the relays R and the top end 84 of the circuit board 82 are configured to mate with electrical devices, such as fuses F along a transverse direction TD substantially perpendicular to the circuit board 82 and substantially perpendicular to the mounting direction MD. The connection terminals 88 near the bottom end 86 of the circuit board 82 are configured to mate with the connectors of one or more wiring harnesses that extend into the fuse and relay block assembly 10 via the wiring harness guide 26. The connection terminals 88 also may be configured to accommodate the wiring harness connectors along the transverse direction TD The relay module assembly 80 further includes front and rear covers 90 and 92 that are assembled around the circuit board 82 and releasably engaged with one another. The front cover 90 includes a top 94 and a bottom 96. Regions of the rear cover 92 between the top 94 and the bottom 96 define a continuous closed wall configured to enclose and protect the relays R mounted in the region of the circuit board 82 between the top and bottom ends 84 and 86. Regions of the front cover 90 in proximity to the top end 94 define a plurality of cavities 98 configured to receive the fuses F along the transverse direction TD that is substantially perpendicular to the mounting direction MD. Regions of the front cover 90 in proximity to the bottom end 96 define cavities 100 that open in the transverse direction TD and are configured to receive connectors of the wiring harness for mating with the connection terminals 88 near the bottom and 86 of the printed circuit board 82. Dimensions of the relay module 80 in the front to rear direction and dimensions of the relay module 80 in directions parallel to the top and bottom edges 84 and 86 of the circuit board 82 are selected to permit the relay module 80 to be telescoped into the relay module cavity 50 of the relay block collar 30.

The fuse and relay block assembly 10 is assembled by telescoping the relay block 70 and the relay module assembly 80 into the relay block cavity 48 and the relay module cavity 50 of the relay block collar 30. The relay block cavity locks 52 and the relay module cavity locks 54 will engage corresponding locking structures on the relay block 70 and the relay module assembly 80 for securely retaining the relay block 70 and the relay module assembly 80 in the respective cavities 48 and 50 of the relay block collar 30. Connectors of the wiring harnesses then may be mated with corresponding connectors of the relay module assembly 80 and the relay block 70 from positions near the lower and 34 of the relay block collar 30. In this preliminarily assembled condition, the top end 72 of the relay block 70 will be approximately flush with the top end 32 of the relay block collar 30. However, the top end 94 of the relay module assembly 80 will project up beyond the top end 32 of the relay block collar 30 so that the fuses F in the cavities 98 of the relay module assembly 80 are accessible in the transverse direction TD at regions above the relay block collar 30 and above the relay block 70. Thus, the relays R and the fuses F of the relay block 70 are accessible along the mounting direction MD, whereas the fuses F of the relay module assembly 80 are accessible above the relay block 70, but along the transverse direction TD. This orientation permits a significantly greater density of fuses F and relays R to be accommodated in the fuse and relay block assembly 10 without enlarging the footprint. Additionally, the relays R of the relay module assembly 80 are within the area between the top and bottom ends 32 and 34 of the relay collar 30.

The subassembly of the relay collar 30 with the relay block 70 and the relay module assembly 80 is mounted into the lower cover 12 so that the lower cover locks 56 on the front and rear walls 38 and 40 of the relay block collar 30 lock into engagement with the locking structures 28 projecting up from the top end 16 of the lower cover 12. The upper cover 60 then can be mounted on the open top end 32 of the relay collar 30 so that the locks 68 of the upper cover 60 engage the locks at opposite ends of the relay block collar 30. The elevated region of the top wall 62 of the upper cover will nest over the top end of the relay module assembly 80.

The fuse and relay block assembly 10 enables a significant increase in the density of the relays R and the fuses F without increasing the footprint of the fuse and relay block assembly 10 and while still maintaining efficient accessibility to all of the relays R and fuses F that are likely to require service or replacement.

The invention has been described with respect to a preferred embodiment. However, it is apparent that various changes can be made without departing from the scope of the invention as set forth in the claims, and the skilled artisan will appreciate that other embodiments, including those mentioned below are within the scope of the claims.

The relay block 70 and the relay module assembly 80 can be mounted from either the top end or the bottom end of the relay block collar 30.

The relay block collar 30 can be omitted and the relay block 70 and the relay module assembly 80 can be mounted directly in the lower cover 12.

Other arrangements for locking the various disclosed components together can be provided and of course other shapes can be selected in accordance with the available space in the vehicle.

What is claimed is:

1. A fuse and relay block assembly, comprising:
   a lower cover;
   an upper cover mounted opposed to the lower cover for defining a substantially enclosed space between lower cover and the upper cover;
   a relay block collar mounted to the lower cover and between the upper and lower covers, the relay block collar includes a relay block cavity for receiving the relay block and a relay module cavity;
   a relay block mounted in the relay block cavity of the relay block collar and between the lower and upper covers, the relay block having at least one first electrical device mounted therein along a mounting direction; and
   a relay module assembly mounted in the relay module cavity of the relay block collar and between the lower and upper covers, the relay module assembly having at least one second electrical device mounted therein along a transverse direction that is transverse to the mounting direction.

2. The fuse and relay block assembly of claim 1, wherein the transverse direction is substantially perpendicular to the mounting direction.

3. The fuse and relay block assembly of claim 2, wherein the relay module assembly projects toward the upper cover farther than the relay block, the second electrical device mounted to the relay module assembly being at a position between the relay block and the upper cover.

4. The fuse and relay block assembly of claim 3, wherein the at least one first electrical device mounted to the relay block comprises at least one relay and at least one fuse.

5. The fuse and relay block assembly of claim 3, wherein the at least one second electrical device mounted to the relay module assembly comprises at least one relay and at least one fuse.

6. The fuse and relay block assembly of claim 1, wherein the relay block collar has an open top communicating with areas of the communicating with areas of the fuse and relay block assembly between the relay block collar and the lower cover, the relay block cavity and the relay module cavity each extending through the relay block collar from the open top to the open bottom.

7. The fuse and relay block assembly of claim 6, wherein the relay block has a top surface substantially aligned with the open top end of the relay block collar and wherein the relay module assembly has a top end projecting above the open top end of the relay block collar.

8. The fuse and relay block assembly of claim 7, wherein the relay module assembly includes a plurality of electrical devices mounted therein at positions between the open top and the open bottom of the relay block collar.

9. The fuse and relay block assembly of claim 7, wherein the relay module assembly has front and rear covers, the front cover of the relay module assembly being formed with a plurality of cavities extending therein along the transverse direction and disposed at positions above the relay block collar, electrical devices being removably mounted into the cavities along the transverse direction.

10. The fuse and relay block assembly of claim 1, wherein the relay module assembly includes a circuit board defining a plane extending substantially along the mounting direction.

* * * * *